United States Patent
Pink

[11] 3,811,647
[45] May 21, 1974

[54] VENTING OF ELECTROFORM REFLEX INSERTS BY LASER DRILL

[75] Inventor: Frank A. Pink, Ann Arbor, Mich.

[73] Assignee: Ford Motor Company, Dearborn, Mich.

[22] Filed: June 28, 1972

[21] Appl. No.: 266,887

[52] U.S. Cl................. 249/160, 425/420, 425/808
[51] Int. Cl. ............................................. B29c 1/14
[58] Field of Search................. 249/160, 175, 117; 425/447, 468, 470, 812, 808, 420

[56] References Cited
UNITED STATES PATENTS

| | | | |
|---|---|---|---|
| 1,822,451 | 9/1931 | Oestnaes | 425/808 X |
| 180,384 | 7/1876 | Smith | 425/420 |
| 1,157,612 | 10/1915 | Bennett | 425/420 |
| 3,277,535 | 10/1966 | Rupert | 425/808 X |
| 3,443,281 | 5/1969 | Walby | 425/808 X |
| 3,524,046 | 8/1970 | Brouwer | 83/170 X |
| 2,277,599 | 3/1942 | McGinnis | 425/420 |
| 3,632,695 | 1/1972 | Howell | 425/808 X |

Primary Examiner—Robert L. Spicer, Jr.
Attorney, Agent, or Firm—Joseph W. Malleck; Keith L. Zerschling

[57] ABSTRACT

A unitary electroplated reflex insert preferably made of high nickel alloy, useful in completing a molding assembly for making plastic retrodirective reflectors. The insert has a patterned surface contoured with a plurality of multi-faceted cube-corner projections arranged with adjacent edges of commonly joined facets defining female apices; microbores are constructed through said female apices such as by laser beam drilling to provide a venting system.

7 Claims, 5 Drawing Figures

PATENTED MAY 21 1974　　　　　　　　　　　　　　3,811,647
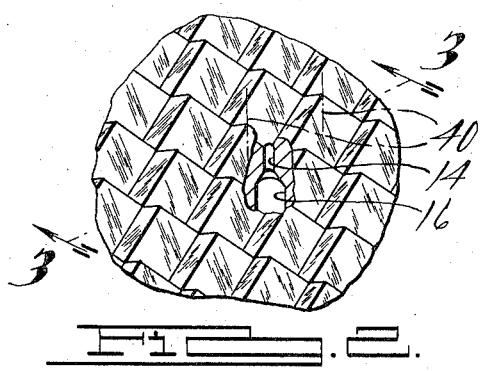
FIG. 2.
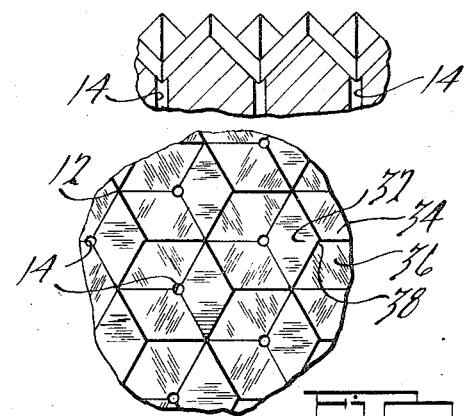
FIG. 3.
FIG. 5.
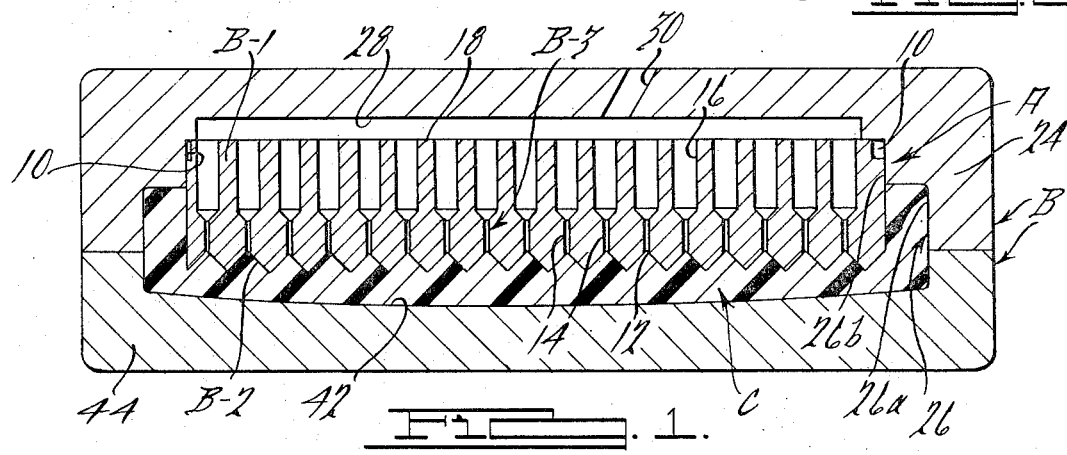
FIG. 1.
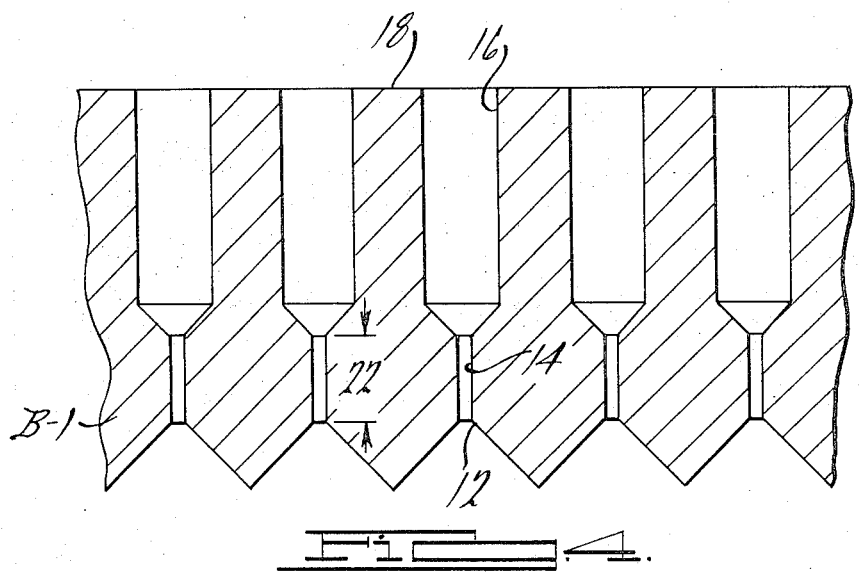
FIG. 4.

VENTING OF ELECTROFORM REFLEX INSERTS BY LASER DRILL

BACKGROUND OF THE INVENTION

This invention relates to the fabrication of reflectors commonly referred to as cube-corner type, the main feature of which is to return light back toward its source provided the path of incidence of the source light to the frontal face of the reflector is not too wide of normal. The usual construction of such reflectors includes a smooth outer frontal surface and an accurately defined back surface constituted of cube-corners each having facets that intersect one another preferably at 90° forming a cube-cornered prism. Light entering the frontal surface is refracted through the body of the reflector and multi-reflected by the arrangement of facets to return and exit from the frontal face of the reflector substantially along or parallel to the path at which it entered.

In order to permit the fabrication of such cube-corner reflectors, the standard procedure has been to firstly make a great number of metal pins each having a hexagonal cross-section and each having one end ground and polished to define a single cube-corner, most notably with three facet surfaces intersecting to define a male apex. Secondly, the pins are arranged in side by side fashion, locked together at their bases to form an assembly with the male apices of the pins lying substantially in the same plane. The hexagonal sides of the pins facilitate close geometric arrangement for locking together such as by welding. The resulting welded bundle of pins define an insert which is then received by a more comprehensive molding element for completing a molding assembly useful in molding clear plastics such as acrylic.

Pin bundles inherently provide a reserve space into which gases penetrate but into which plastic is blocked; these spaces result from the unwelded juxtaposition of the upper hexagonal pin sides which define crevices radiating from common female apices resulting from the valleys of adjacent facets on different pins. Such pin bundles therefore do provide the advantage that gases can move out of the way of the supply plastic to achieve a close identity of the mold surfaces without gas interference. In many instances the spacing between pins is no larger than 0.0001 inch.

However, a principal disadvantage of pin bundles is the requirement for separate lapping and polishing of each pin cube-corner which it is extremely expensive. To solve the high cost of fabrication, experimenters have turned to electroplating reflex inserts from an initial master pattern made from hexagonal pins, the reflex insert then being used for direct molding having a considerably longer life. To fabricate a reflex insert, a body of material is electroplated against the conductive surface of the pin bundle to produce a reverse of that surface; the resulting electro-formed molding insert is continuous and therefore does not have any internal spaces or passages for venting of gases that may collect in the female apices of the cube-corners. This significantly influences molding effectiveness; a low level of optical brilliance results since the facets of the plastic reflector will be rounded at the outermost points which normally perform as the most critical light collecting regions of the cube-corners.

Other disadvantages of pin bundle inserts have been the collection of residue on the molding reflex surfaces (this has been a problem not only with pin bundle inserts but as well with conventional electroformed inserts). Experience has shown that molds of either type cycled 25 to 100 thousand times require polishing. Each polishing reduces the quality of the form since minute microscopic scratches appear and sharp corners begin to round off. Furthermore, the assembly and disassembly of the pin bundle inserts requiring movement in and out of the mold tends to make these inserts vulnerable to bumps and jars regardless of how carefully they are handled. Because the spaces between pins of a pin bundle are closed by welding, the residue containing gases do not have an opportunity to flush continuously outwardly from the mold cavity. Therefore, it is important that the amount of residue collecting on the molding surfaces be reduced to prolong molding life and reduce handling hazards.

Yet another problem related to pin bundle inserts and their fabrication is difficulty of attaining Class A brilliance in reflectors used on autos. In accordance with the specification set forth by the Society of Automotive Engineers, there are two class divisions of reflecting devices of this kind; Class A requiring visibility from all distances between 100 and 600 ft. when illuminated by the upper beam of an auto; and Class B requiring visibility from all distances between 100 and 350 ft., also when illuminated by the upper beam. Automotive manufacturers desire to produce reflectors of Class A brilliance which can only be obtained by near perfect angulation and alignment of the cooperating facets as required, as well near perfect flatness of the facets being no coarser than $1.5 \times 10^3$ angstroms. Difficulties in achieving perfection by the pin bundle insert approach can be appreciated when the following is considered: (a) small pin sections make it difficult to accurately position all of the pins uniformly in a longitudinal direction and maintain proper lateral orientation when being fixed by the welding, (b) frequent handling at the molding site raises the risk of damaging the very precisely ground optical facets on the ends of the pins.

Accordingly, there is a need for a different fabricating technique which guards against handling difficulties, is more economical, and provides for enhanced brilliance in the molded reflector by sharply defined cube-corners. To overcome the problem of entrapment of gases, the invention contemplates at least two features: (a) the use of a unitary electroplated reflex insert preferably formed of high nickel alloy and (b) the provision of microsized passages completely venting the female apices of the cube-corners on the insert. Counter-bore openings, in the backside of the insert, communicate with a venting manifold whereby residue of the vented gases may be collected exteriorly and prevented from returning to the cube-corner insert facets leading to contamination.

BRIEF SUMMARY OF THE DRAWINGS

FIG. 1 is a central sectional elevational view of a molding assembly showing plastic injected into the molding cavity formed by the assembly;

FIG. 2 is a perspective view of a portion of a molding insert forming part of the assembly of FIG. 1 and illustrating in phantom outline one micro-bore of the venting system;

FIG. 3 is a sectional view of the portion of a molding insert of FIG. 2, taken along line 3—3 thereof;

FIG. 4 is an enlarged fragmentary view of a portion of the insert illustrated in FIG. 1; and FIG. 5 is a plan view of a portion of the cube-cornered surface of the insert.

DETAILED DESCRIPTION

As shown in FIG. 1, a molding assembly is illustrated broadly comprising a unitary molding insert A, split parent molding elements B effective to receive the molding insert A, and a molded product C having the configuration imparted by the internal walls of the parent elements and insert. The molding insert broadly comprises a unitary body B-1, a surface area B-2 having a series of multi-faceted projections for imparting a reflex system to one portion of the molded product, and a venting means B-3.

In more particularity, the insert B is formed by an electroplating process whereby the mass of the insert is built up gradually taking on a reverse identity of a master pattern surface. The master pattern surface (not shown) may be provided by a conventional fabricating technique employing a plurality of metallic pins each having a hexagonal cross-section and each having one end lapped and polished to define three facets or surfaces intersecting at a point (male apex) through which a theoretical reflex axis would pass if the pin were made of a light transmitting material whereby light coming upon the facets would be retrodirected to return along the path of incidence. The pins are arranged in parallel alignment, preferably having their male apices in a predetermined plane or shape; welding is used to lock the pins together at their ends remote from the cube-corners defined by said facets. The pins now constitute a pin bundle which acts as a master pattern for the electroplating process.

The pins being of an electrically conductive material, are connected as the cathode in a solution treatment. D.C. current is intorduced through the anode, which consists of nickel alloy, whereby the anode metal dissolves and deposits on the cathode. Separation of the electroformed alloy from the cathode is provided by coating the pin bundle with a material such as graphite; current density (amps/ft.$^2$), quantity of electricity (coulombs), and time of electroplating are controlled so as to deposit an appropriate alloy thickness over the pin bundle, preferably in the range of one-half to three-fourths of an inch. The resulting electroplated insert is unitary and possesses a cube-corner pattern (three facet surfaces 32, 34, 36 equiangularly arranged about a male apex 38 with a central axis 40) along one side thereof which has very bright surfaces and are sharply defined from a geometric standpoint. Next, the electroformed insert may be provided with a base for mounting within one of the parent molding elements of the assembly, such base may have alignment shoulders 10 defined by suitable machining as well as threaded bores (not shown) for receiving fastening elements.

If the unitary, unvented electroplated insert, were to be used in the molding assembly, residue or film would collect on the cube-corners or facets of the insert after a relatively short period of time (perhaps a minimum of 25,000 injection molding cycles), the film being comprised of foreign material carried in gases that become entrapped during the molding process particularly in the region of female apices 12 of the surface region. This film can become quite detrimental to molding because it affects precision as well as thermal properties of the molding process.

To overcome this problem presently, the prior art contemplates sequential steps of electro-polishing which may consume a treatment time of approximately 6 to 8 hours for each individual insert and may tend to develop minute microscopic scratches on the facet surfaces as well as the sharp corners. Over a period of several cleaning processes the sharp corners begin to round off distorting geometric precision. The cleaning process in addition encourages further geometric vulnerability in that they may be broken or harmed during the disassembly and reassembly of the inserts in spite of careful handling procedures. The related labor costs for downtime of the molding inserts coupled with the cost of the cleaning process, can be rather significant for high production conditions.

This invention overcomes such disadvantages, by the incorporation of a venting system which comprises micro-bores or cylindrical passages 14 having a predetermined microdiameter extending from a female apex of the molding insert to a counterbore or cylindrical passage 16 which interrupt the rear face 18 of the molding insert. The preferred embodiment comprehends the use of lazer drilling techniques for achieving the micro-passages 14 and 16, a laser being a focused beam of light which is absorbed in a small region and the temperature thereby is raised to heat, melt and vaporize the material to be drilled. As stated, the purpose is to provide venting of gases that may become entrapped in the molding cavity while preventing the passage of a plasticized solid medium under pressure such as soft acrylic plastic. To this end, experiments have shown that the cylindrical passages of about 0.004 inches with plus or minus 3 percent hole tolerance achieves this function.

To provide for high production capability in the drilling of such passages 14 and 16, a tape controlled drilling mechanism may be employed which incorporates an adjustable drilling table having $x$ and $y$ coordinates for precisely orienting a series of laser drilling heads effective to maintain extremely high accuracy. For example, on certain of the inserts that have been embodied, approximately 600 drilling passages may be required for a single insert, the insert having an area of approximately 7 inches by 2 inches. The materials that may be used to generate a laser for the required drilling may be selected from: ruby, neodymium-doped glass. The laser beam should be operated in a continuously pumped mode with a very short pulse duration so that only a very small amount of material is removed to obtain the micro-passages. The counter-bores are drilled to a diameter of preferably 0.04 inches with a tolerance of plus or minus 0.005. The point at which the counter-bores connect with the micro-bores is spaced a distance 22 approximately 0.04 inches from the associated female apex which is at least 10 times the diameter of the micro-bore. To complete the venting of all of the counter-bores of the insert, the parent molding element 24 has a cavity 26, part of the walls 26a forming the finished molding surfaces and the other walls 26b defining a recess into which the insert is nested; at least one groove 28 (constituting a venting manifold into which is flushed contaminants collected in the counter-bores) is defined in the recess for communicating all of the counter-bores with a passage 30 leading to the exterior.

No illustration is made of the resulting molded lens or product, it can be understood to comprise the reverse cube-cornered surface as that of the insert. In operation, the lens has a frontal face defined by interior wall 42 of the lower parent molding element 44. The frontal face is normally arranged so that incident light will be received within the range of approximately 45° of a line normal to the face. Within this general operative range, a beam of light will enter the body of plastic material and be refracted slightly so as to enter one of the cube-cornered cluster of surfaces of the lens which may be independently coated with reflective material or an independent body may be placed immediately adjacent the cube-corners so as to provide a reflecting surface. The light will contact one of the surfaces of a cube-corner and be reflected in series to the other surfaces of a single cube-corner cluster; in doing so the composite reflections will return the beam of light substantially parallel to the axis 40 of the cube-corner which is generally aligned with the contemplated path of the beam of light as refracted in the body of material. When the beam of light again passes through the frontal face it will have a path substantially parallel to its incoming path.

By virtue of the instant invention, the cube-corners or prisms are more sharply defined particularly in the region adjacent the apex where the reflex characteristics of the lens has its greatest capability and brilliance. The facets can function more effectively over a greater zone of entering light than has heretofore been capable.

I claim:

1. For use in fabricating a cube-corner reflector, a molding insert comprising:
   an impervious body of heat conductive material having at least one patterned surface defined with a plurality of multi-faceted cube-corner projections arranged with adjacent edges of commonly joined facets defining female apices, each cube-corner having a male apex and an axis passing through said male apex in an equiangularly spaced relation to the facets thereof, the axes of said male apices being generally parallel aligned, said body being particularly characterized by a passage extending through the female apex for venting to atmosphere, each passage being small enough to prevent the passage of a plasticized solid medium under pressure while permitting the passage of gases.

2. A molding insert as in claim 1, in which at least a portion of said passage is cylindrical and has a diameter no greater than 0.01 inch.

3. For use in fabricating a cube-corner reflector, a molding assembly, comprising:
   a. parent molding means having walls defining a molding cavity and other walls defining a recess;
   b. a unitary mold insert received by said recess for operable positioning and support therein while occupying less than the total space of said recess for defining a venting manifold and having one surface zone cooperating with said cavity walls to complete a molding chamber, said surface zone having a plurality of multi-faceted cube-corner projections arranged with edges of each facet commonly joined with edges of adjacent facets to define female apices, each projection having a male apex and an axis equiangularly spaced from said facets while passing through said male apex, said axes being generally parallel aligned, said insert being particularly characterized by an opening passing through the of said female apices and communicating with said venting manifold, each opening being dimensioned to prevent the passage of a plasticized solid medium under pressure while permitting the passage of gases.

4. A molding assembly as in claim 3, in which each said insert opening comprises a laser-drilled micro-bore and a counter-bore with a diameter at least ten times greater than said micro-bore and intersecting with said micro-bore and said venting manifold whereby contaminants in gases passing through said micro-bore are collected for flushing into said manifold.

5. A molding assembly as in claim 4, in which said micro-bore has a diameter no greater than 0.005 and said counter-bore has a diameter no greater than 0.040 inches.

6. A molding insert as in claim 3, in which said laser-drilled micro-bore has a terminal portion spaced a distance from said female apex at least ten times the diameter of said counter-bore.

7. A molding insert as in claim 1, in which said body of material is constituted of electroplated nickel alloy.

* * * * *